(12) United States Patent
Cariou

(10) Patent No.: US 12,083,778 B2
(45) Date of Patent: Sep. 10, 2024

(54) SOUNDPROOFING COATING COMPRISING A CELLULAR STRUCTURE

(71) Applicant: Airbus Operations SAS, Toulouse (FR)

(72) Inventor: Charles Cariou, Toulouse (FR)

(73) Assignee: Airbus Operations SAS, Toulouse (FR)

(*) Notice: Subject to any disclaimer, the term of this patent is extended or adjusted under 35 U.S.C. 154(b) by 318 days.

(21) Appl. No.: 17/624,458

(22) PCT Filed: Jun. 16, 2020

(86) PCT No.: PCT/EP2020/066624
§ 371 (c)(1),
(2) Date: Jan. 3, 2022

(87) PCT Pub. No.: WO2021/004735
PCT Pub. Date: Jan. 14, 2021

(65) Prior Publication Data
US 2022/0355566 A1 Nov. 10, 2022

(30) Foreign Application Priority Data
Jul. 5, 2019 (FR) ...................................... 1907509

(51) Int. Cl.
*B32B 3/18* (2006.01)
*B32B 3/12* (2006.01)
(Continued)

(52) U.S. Cl.
CPC .................. *B32B 3/18* (2013.01); *B32B 3/12* (2013.01); *F02C 7/045* (2013.01); *F02K 1/827* (2013.01);
(Continued)

(58) Field of Classification Search
CPC .... F02C 7/045; F02C 7/24; B64D 2033/0206; B64D 33/02; B64D 29/00; F02K 1/827
See application file for complete search history.

(56) References Cited

U.S. PATENT DOCUMENTS 3,821,999 A 7/1974 Guess et al.
6,122,892 A * 9/2000 Gonidec .................. B32B 3/12
428/116

(Continued)

FOREIGN PATENT DOCUMENTS

EP 3060829 B1 12/2020

OTHER PUBLICATIONS

International Search Report; priority document.
French Search Report; priority document.

*Primary Examiner* — Dedei K Hammond
*Assistant Examiner* — Joseph James Peter Illicete
(74) *Attorney, Agent, or Firm* — Greer, Burns & Crain, Ltd.

(57) ABSTRACT

A soundproofing coating with a cellular structure having several structures connected in a transverse direction, each formed by connecting a first longitudinal strip with a second longitudinal strip. Each structure has, successively in the longitudinal direction, 1) a first cavity, the cross-section of which narrows gradually in the thickness of the coating until it closes, 2) a first connection of two walls, respectively of the first strip and the second strip, in contact with each other over part of the thickness of the coating, which provides a passage between the first cavity and a second cavity that thus form a Helmholtz resonator, 3) the second cavity, the cross-section of which gradually increases in the thickness of the coating and which is closed by a closing sheet, and 4) a second connection of two walls.

11 Claims, 7 Drawing Sheets

(51) Int. Cl.
  *B64D 33/02* (2006.01)
  *F02C 7/045* (2006.01)
  *F02K 1/82* (2006.01)
(52) U.S. Cl.
  CPC ..... *B32B 2307/102* (2013.01); *B32B 2605/18* (2013.01); *B64D 2033/0206* (2013.01)

(56) References Cited

U.S. PATENT DOCUMENTS

| | | | | |
|---|---|---|---|---|
| 8,999,482 | B2* | 4/2015 | Tanii | B32B 37/146 |
| | | | | 428/116 |
| 9,284,726 | B2* | 3/2016 | Tien | E04B 1/84 |
| 9,546,602 | B2* | 1/2017 | Julliard | G10K 11/168 |
| 11,059,559 | B2* | 7/2021 | Cedar | E04B 1/86 |
| 11,348,565 | B2* | 5/2022 | Ravise | F02K 1/827 |
| 2015/0292413 | A1 | 10/2015 | Soria et al. | |
| 2018/0174568 | A1 | 6/2018 | Porte et al. | |

* cited by examiner

SOUNDPROOFING COATING COMPRISING A CELLULAR STRUCTURE

CROSS-REFERENCES TO RELATED APPLICATIONS

This application claims the benefit of the International Application No. PCT/EP2020/066624, filed on Jun. 16, 2020, and of the French patent application No. 1907509 filed on Jul. 5, 2019, the entire disclosures of which are incorporated herein by way of reference.

FIELD OF THE INVENTION

The present invention relates to the field of soundproofing structures. It relates, in particular, to a soundproofing coating of cellular structure. The coating that forms the subject matter of the invention may have applications particularly in the field of aeronautics, for example in nacelles for aircraft propulsion units.

BACKGROUND OF THE INVENTION

Coatings or panels having a cellular structure made up of cells or pockets, which is to say, of juxtaposed hollow individual volumes, are used in numerous technical fields, notably the aeronautical field. They may offer a high level of stiffness for a low mass. Coatings comprising a cellular structure having open cells on one face, or at the very least cells that communicate with the outside of the panel, are used for their soundproofing properties. Such panels are sometimes referred to as acoustic panels.

Panels or coatings with a cellular structure may be formed from various materials, for example plastics, composites or metals. The cells may exhibit varying geometries. One well known shape for a cellular structure has cells in the form of right prisms on a hexagonal base. This type of structure with hexagonal cells is often referred to as a "honeycomb" structure, although this expression is also used, inaccurately, to refer to cellular panels having cells of other shapes.

Thus, a conventional acoustic panel or coating generally comprises a honeycomb core interposed between a perforated sheet or a sheet comprising a metal mesh permeable to acoustic waves forming a first face, and a closure sheet, generally solid, closing off the cells and forming a second face of the coating.

The cells of the acoustic panels act like small resonators able to absorb acoustic waves over a given frequency range. In order for a resonator to be effective, its absorption frequency range needs to include the frequency to which the panel is subjected. Now, the relatively small sizes of cavity found in acoustic panels correspond to high frequencies. It is therefore difficult to obtain a cellular panel that is effective for certain applications that are subjected to low frequencies.

More generally, the acoustic panels known from the prior art are generally effective at medium frequencies only. For example, the propulsion units of commercial airliners comprise a turbomachine engine and a nacelle that may have an acoustic coating to deaden the noise generated during operation of the engine. Nevertheless, the acoustic frequencies generated by the engine of an aircraft are relatively low and extend over a fairly broad range. The low frequencies that need to be deadened are, for example, the frequencies below 2000 Hz, depending on the engine considered. The adoption of large-diameter propulsion units has a tendency to lower the frequencies of the acoustic waves that they generate still further, notably below 1000 Hz. Now, the need to have large-volume cells in order to absorb low frequencies leads to panels that are very thick, not at all compatible with aeronautical applications.

Document US2015292413 discloses an acoustic panel of which the geometry of the cells is improved with a view to application to an aircraft engine. In particular, the cells of the acoustic coating described in document US2015292413 extend in a curved S-shape so as to lengthen them. Increasing the length of the cells allows absorption of lower frequencies for the same thickness of panel as with straight cells.

Nevertheless, such an acoustic panel provides a limited shifting of the frequencies handled toward low frequencies as compared with conventional straight-cells panels, has poor mechanical strength and is difficult to produce.

The invention thus seeks to propose an acoustic coating capable of handling low frequencies, having good structural qualities and capable of being produced on an industrial scale.

SUMMARY OF THE INVENTION

Thus, the invention relates to a soundproofing coating comprising a cellular structure formed in a thickness of the coating between an open first face, permeable to acoustic waves, and a closed second face formed by a closure sheet. The cellular structure is made up by joining, in a so-called transverse direction, several structures, each of the structures being formed by joining, in the transverse direction, a first longitudinal strip of a first geometry with a second longitudinal strip of a second geometry. The first strip and the second strip are configured so that each structure exhibits successively and repeating in the longitudinal direction:

a first cavity extending between the first face and the second face and open at the first face and of which the cross section narrows progressively between the first face and the second face until the first cavity becomes closed, a first joining of two walls belonging respectively to the first strip and to the second strip in contact with one another over part of the thickness of the coating so that a passage is created between the first cavity and a second cavity, the second cavity, which has a cross section that increases progressively between the first face and the second face and which is closed at the first face and at the second face of the coating by the closure sheet, a second joining of two walls belonging respectively to the first strip and to the second strip in contact with one another over all or part of the thickness of the coating.

The fact that the cellular structure of the coating is made up by joining structures which are themselves formed of two strips means that this structure can be produced in a simple way. Furthermore, the first cavity, open on the first face, forms a quarter-wave resonator which is connected to a second cavity by a passage of restricted cross section.

Thus, each assembly formed of a first cavity, of a passage, and of a second cavity forms a resonator which can be likened to a Helmholtz resonator, the neck of which is formed by the passage. Such resonators formed in the acoustic coating are able to handle markedly lower acoustic frequencies than an acoustic coating with straight or curved cells as known from the prior art.

In each structure, the first strip and the second strip may be symmetrical along a longitudinal plane.

The passage between the first cavity and the second cavity may advantageously be formed near the second face of the coating.

The joining of the structures may be performed in a staggered configuration, each first cavity of one structure being adjacent, in the transverse direction, to two second cavities of neighboring structures, and each second cavity of one structure being adjacent, in the transverse direction, to two first cavities of neighboring structures.

An intermediate cavity, open at the first face, may be formed longitudinally between each first cavity of two transversely adjacent structures.

Each first cavity may have a hexagonal open cross section at the first face, and each intermediate cavity may have a parallelogram-shaped cross section at the first face.

A drain may be formed, near the second face, between two longitudinally successive intermediate cavities.

The following may be formed in such a coating:
- for each first cavity, a passage between the second cavity and each of the first cavities longitudinally closest to the second cavity, thus placing the first cavities in communication via the second cavity, near the second face of the coating;
- for each second cavity, a duct of cross section equal to or smaller than that of the passage connecting the second cavity to at least one neighboring first cavity, near the first face of the coating.

The invention also relates to an aircraft propulsion unit comprising a nacelle and an engine, wherein an internal surface of the nacelle and/or an external surface of a casing of the engine has a soundproofing coating as described hereinabove.

The invention finally relates to a method for manufacturing such a soundproofing coating, comprising the steps of:
- shaping first strips each comprising, in a longitudinal direction, repeats of a of a pattern formed of a half first cavity, a first wall in a first plane, a half second cavity, a second wall in the first plane P1, and a half passage, between the half first cavity and the half second cavity at the first wall,
- shaping second strips each comprising, in the longitudinal direction, repeats of a pattern formed of a half first cavity, a first wall in a second plane, a half second cavity, a second wall in the second plane, and a half passage is formed between the half first cavity and the half second cavity, at the first wall;
- forming structures by joining, in a transverse direction, a first strip with a second longitudinal strip;
- joining several structures in the transverse direction.

BRIEF DESCRIPTION OF THE DRAWINGS

Other particulars and advantages of the invention will become further apparent in the following description.

In the attached drawings, given by way of nonlimiting examples.

DETAILED DESCRIPTION OF THE PREFERRED EMBODIMENTS

Figure 1:
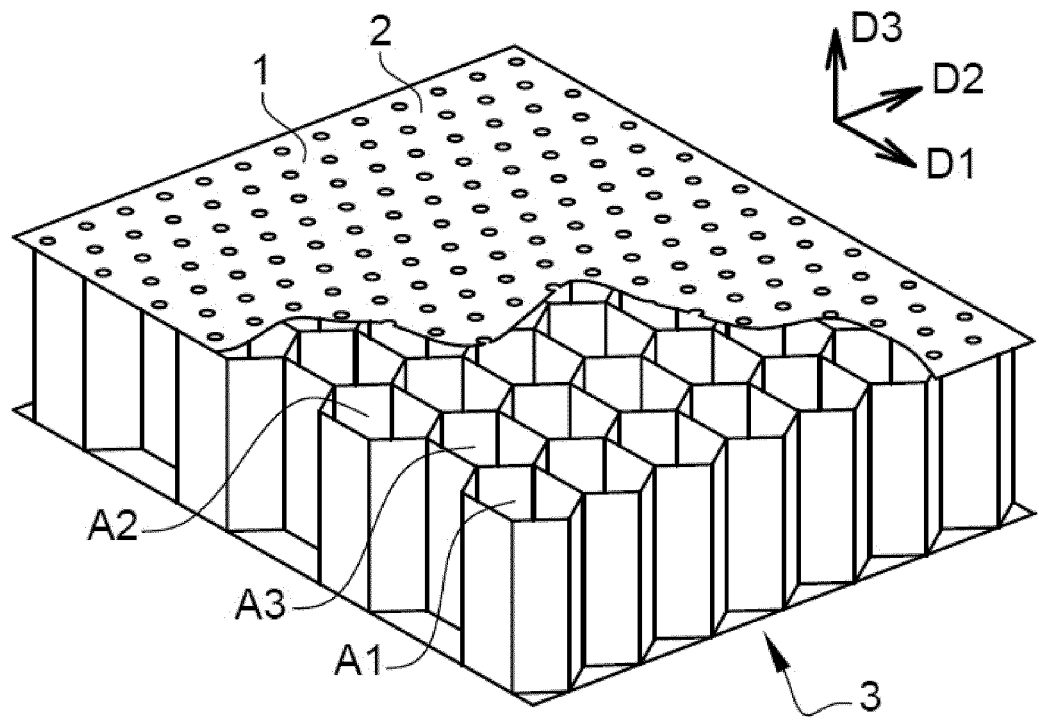
FIG. 1 depicts, in a three-dimensional schematic view, an acoustic coating according to the prior art.

FIG. 1 schematically depicts a soundproofing coating known from the prior art. It comprises cells (or cavities) A1, A2, A3, etc. juxtaposed with one another in two mutually orthogonal directions so as to form a cellular structure. A first direction D1 of juxtaposition of the cells is said to be longitudinal, and a second direction D2 of juxtaposition of the cells, orthogonal to the first direction D1, is said to be transverse. A third direction D3, in which the thickness of the panel extends, is defined orthogonal to the first direction D1 and to the second direction D2. The third direction D3 may conventionally be referred to as the vertical direction D3 (without this in any way prejudicing the orientation of the soundproofing coating).

On a first face 1 of the coating, the cells A1 . . . A3 are open. A perforated sheet 2 covers them, forming a resistive surface allowing the cells A1 . . . A3 to communicate with the external surroundings, so that the first face 1 is said to be open.

On a second face 3, the cells A1 . . . A4 are closed by a closure sheet, for example a solid sheet, blocking off the bottom of the cells.

In the prior art, just as in the invention, the closure sheet is generally a solid sheet. Nevertheless, it may be a sheet that has holes in. Specifically, a solid sheet is used for simple acoustic treatments, known as SDOF (Single Degree of Freedom) applications and forms a rear skin that is reflective to the acoustic waves. A closure sheet having holes in is used for so-called DDOF (Double Degree of Freedom) acoustic treatments for which a stack of two honeycomb stages is produced, the stages being separated by an intermediate porous skin formed by the closure sheet.

Although such an embodiment is not excluded, stacking two cellular structures as formed in the invention, and examples of which are described hereinafter with reference to FIGS. 4 to 11, is of generally limited benefit because such a stacking of structures generally leads to an acoustic coating that is thick, whereas the structure developed in the invention allows the thickness of the structure to be limited in comparison with the known structures capable of handling similar acoustic frequencies.

In FIG. 1, in order to better show the cellular structure, the soundproofing coating is depicted only in part covered on its first face 1 with the perforated sheet 2. The cellular-structure cells depicted here are said to be hexagonal insofar as their volume is that of a right prism on a hexagonal base extending between the first face 1 and the second face 3 of the soundproofing coating.

The hexagonal cells are arranged in a staggered configuration with a longitudinal offset allowing nesting without dead volume.

Figure 2:
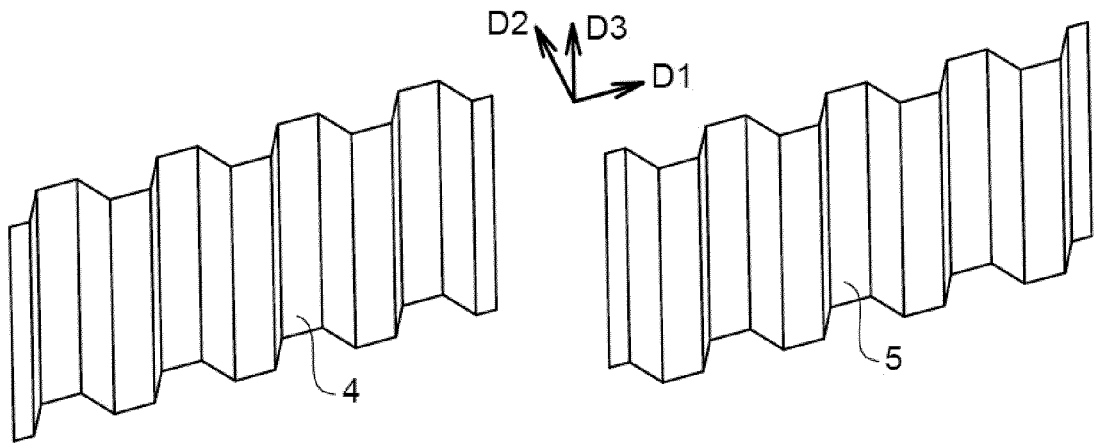
FIG. 2 depicts, in a three-dimensional schematic view, elements that make up the coating of FIG. 1.

FIG. 2 depicts two strips able to make up the cellular structure of the coating of FIG. 1, using a technique known in the prior art on which the present invention is based.

In particular, a first strip 4 has corrugations formed by successive regular bends. Each corrugation forms half of a hexagonal cell. A second strip 5 is identical to the first strip 4.

Figure 3:
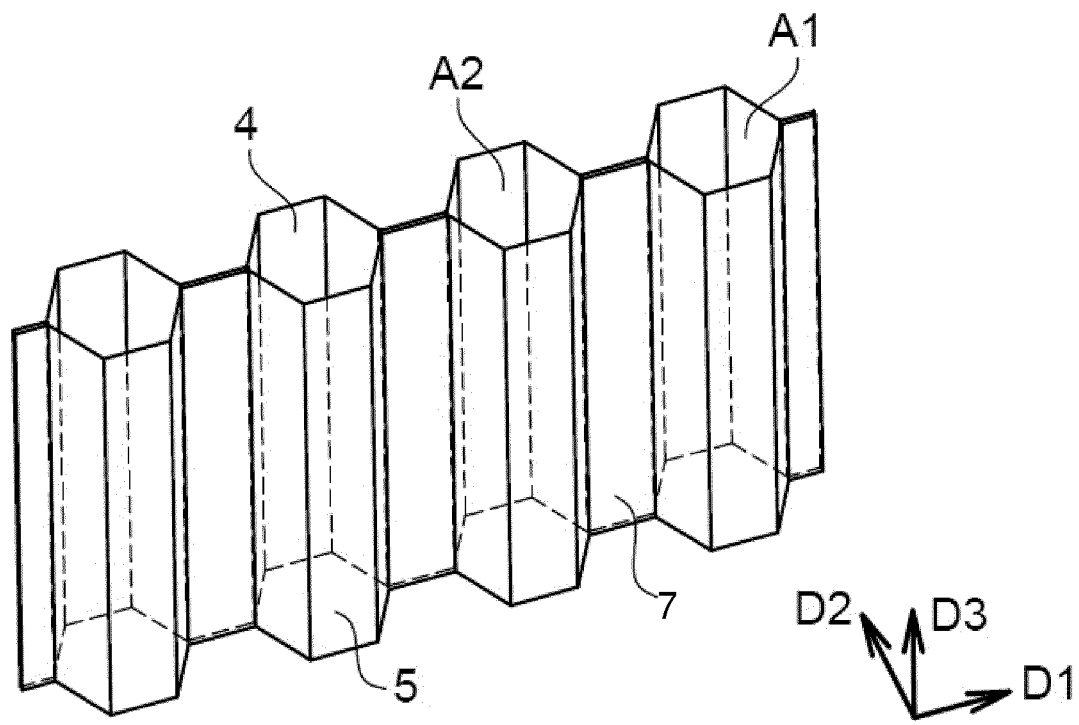
FIG. 3 depicts, in a three-dimensional schematic view, the elements of FIG. 2 after assembly.

The first strip 4 and the second strip 5 are joined together in such a way as to form a structure exhibiting a longitudinal succession of hexagonal cells A1, A2; between which walls 7 are in contact with and connected to one another, for example by bonding or welding. By joining and fixing transversely (in the second direction D2) to the structure of FIG. 3 another identical structure and so on, the cellular structure of the coating of FIG. 1 is obtained.

Figure 4:
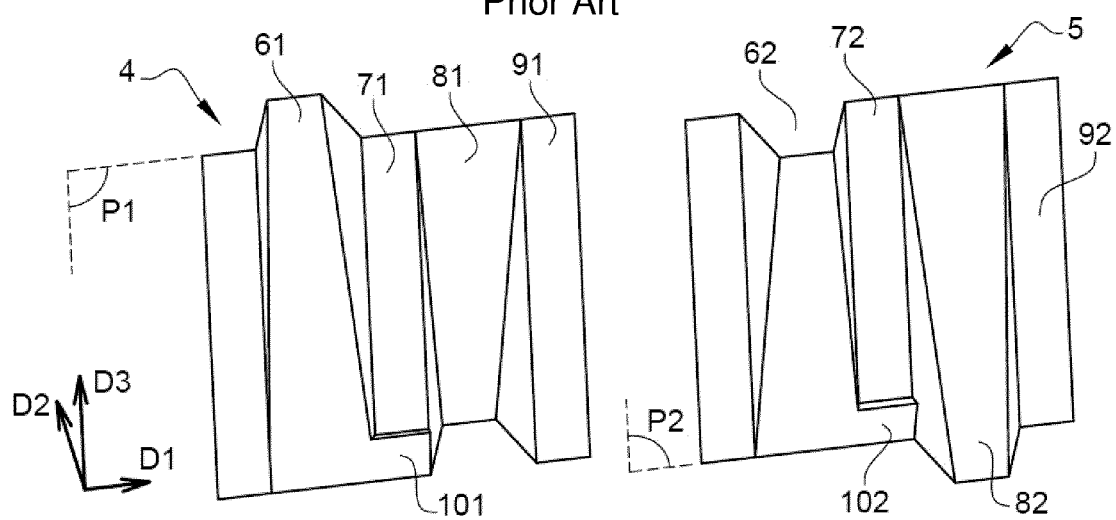
FIG. 4 depicts, in a three-dimensional schematic view, elements that make up an acoustic coating according to one exemplary embodiment of the invention.
Figure 5:
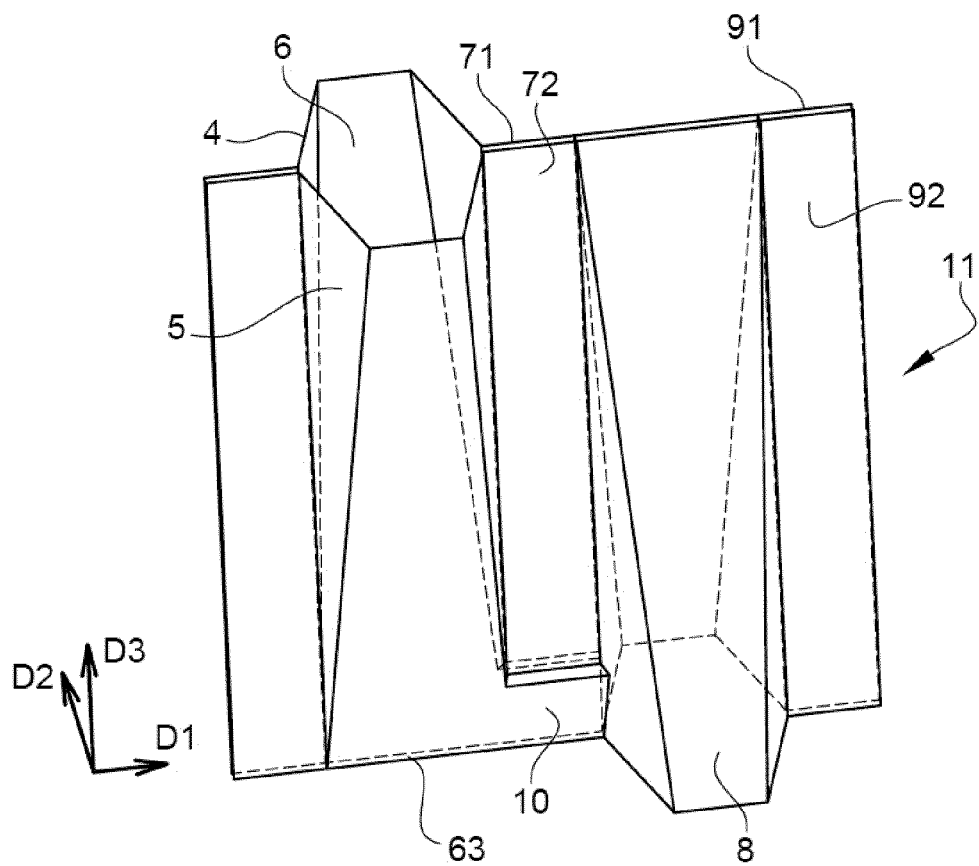
FIG. 5 depicts, in a three-dimensional schematic view, the elements of FIG. 4 after assembly, forming a structure that makes up an acoustic coating according to one exemplary embodiment of the invention.

FIG. 4 depicts elements, namely strips, that make up an acoustic coating according to one exemplary embodiment of the invention. More specifically, FIG. 4 depicts a small longitudinal (in the longitudinal direction D1) portion of, respectively, a first strip 4 and a second strip 5 which are intended to be joined and fixed to one another transversely (in the transverse direction D2) so as to form a longitudinal structure of which a portion is depicted in FIG. 5.

The first strip 4 and the second strip 5 extend essentially in a plane extending in the longitudinal direction D1 and the vertical direction D3. The first strip 4 extends along a first plane P1; the second strip 5 extends along a second plane P2.

Each of the first strip 4 and second strip 5 has deformations, respectively in a single transverse direction. The deformations thus form indentations with respect to, respectively, the first plane P1 (in the case of the first strip 4) and the second plane P2 (in the case of the second strip 5).

In their simplest construction, the first strip 4 and the second strip 5 are made of metal and are shaped using a forming technique. The conceivable forming techniques include, for example, pressing and hydroforming.

In particular, the first strip 4 comprises, successively in the longitudinal direction D1, a half first cavity 61, a first wall 71 in the first plane P1, a half second cavity 81, a second wall 91 in the first plane P1.

A half passage 101 is formed between the half first cavity and the half second cavity 81, at the first wall 71.

The above described pattern is repeated in the longitudinal direction.

In the example depicted here, the first strip 4 and the second strip 5 are of similar shapes, mirror images of one another, so that they are symmetrical with one another when joined together as described hereinafter, with respect to their joining plane. Thus, the second strip 5 comprises, successively in the longitudinal direction D1, a half first cavity 62, a first wall 72 in the second plane P2, a half second cavity 82, a second wall 92 in the second plane P2.

A half passage 102 is formed between the half first cavity 62 and the half second cavity 82, at the first wall 72.

The first strip 4 and the second strip 5 are joined together and assembled, which is to say, that the first plane P1 is brought into contact with the second plane P2. The strips are fixed together for example by bonding or welding of their contacting zones, particularly between their respective first planes 71, 72 and between their respective second planes 91, 92. The half first cavity 61 of the first strip 4 is brought to face the first half cavity 62 of the second strip 5, thus forming a first cavity 8. The half second cavity 81 of the first strip 4 is brought to face the second half cavity 82 of the second strip 5, thus forming a second cavity 8. The half passage 101 of the first strip 4 is brought to face the second half passage 102 of the second strip 5, thus forming a passage 10 between the first cavity 6 and the second cavity 8.

Assembling a first strip 4 with a second strip 5 thus forms a three-dimensional structure 11 extending essentially in the longitudinal direction D1 and depicted in FIG. 5.

Because of the respective shaping of the first strip 4 and of the second strip 5, the structure 11 has the following features.

The first cavity 6 is open on a face parallel to the longitudinal direction D1 and to the transverse direction D2, this face corresponding to the first face 1 of a coating which will be made up as explained hereinafter with reference to FIGS. 6 to 8. The opening of the first cavity 6 is of hexagonal cross section. The cross section of the first cavity 6 narrows progressively toward the bottom 63 of the first cavity 6. In the example depicted here, the cross section narrows until it becomes nil and adopts the form of a straight line at the junction of the first strip 4 with the second strip 5 forming the bottom 63 of the first cavity 6 on a median of the hexagon formed by the opening of the first cavity 6. The bottom 63 may be situated at the second face 3, as in the example depicted here, or between the first face 1 and the second face 3. Thus, in the example depicted here, at the bottom 63, which is to say, at the second face 3 of the soundproofing coating once the latter has been formed (discounting the small thickness closure sheet, which in this instance is namely a solid sheet that closes the second face 3), the first strip 4 is in contact with the second strip 5.

The second cavity 8, which extends advantageously over the entire height (dimensions in the third direction D3) of the structure 11, will be closed once the coating is made up both at the first face 1 and at the second face 3. Specifically, the second cavity 8 has a shape identical to that of the first cavity 6, but with the opposite orientation in the third direction D3. Thus, at the first face or near same, the first strip 4 is in contact with the second strip 5, thus closing the second cavity 8 at the first face 1 of the coating. Notably, contact between the first strip 4 and the second strip 5 may adopt the form of a straight line along a median of the hexagon formed by the cross section of the second cavity 8 at the second face 3. Thus, at the second face 3, where the second cavity 8 of the structure 11 is open with the hexagonal cross section, the second cavity 8 is closed once the coating has been made up by the closure strip that forms the second face 3.

The configuration depicted here maximizes the height of the first cavities 6 while maximizing the volume of the second cavities 8 (thereby enabling lower frequencies to be handled than with cavities of a smaller volume), without the loss of acoustic surface area. It exhibits no breaks in gradient along the height of the walls, which would lead to a solution that was difficult to manufacture.

In a structure 11 and in the cellular structure that is formed, ultimately, each first cavity 6 forms a quarter-wave resonator. The assembly comprising the passage 10 and the cavity 8 forms a Helmholtz resonator of which the neck is formed by the passage 10. The quarter-wave resonator and the Helmholtz resonator are therefore coupled in series at the entry to the passage 10.

Figure 6:
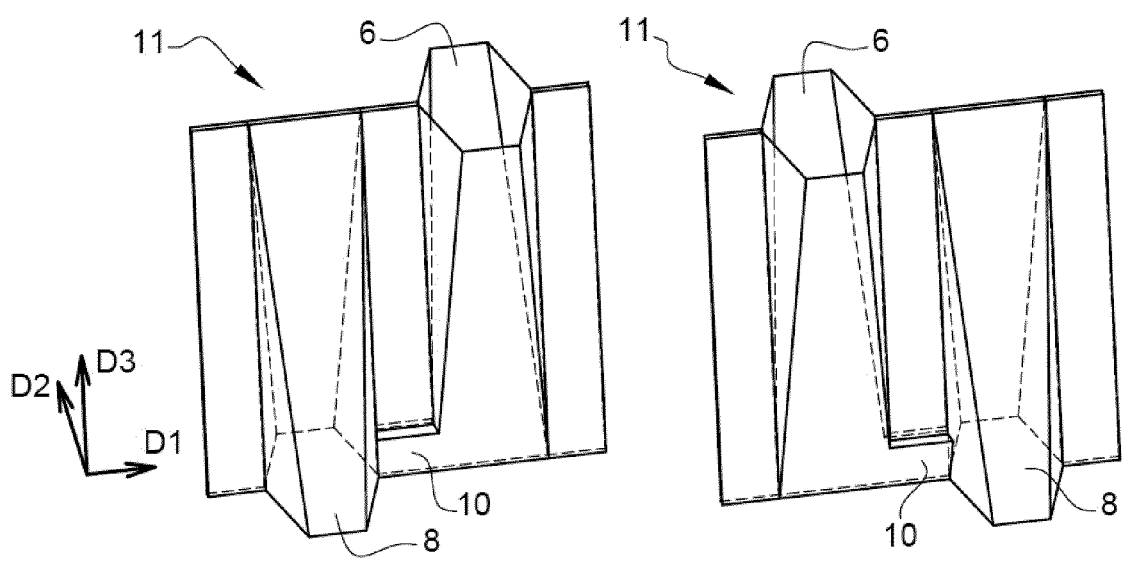
FIG. 6 depicts, in a three-dimensional schematic view, two structures according to FIG. 5.

FIG. 6 depicts two structures 11 intended to be joined and assembled transversely to form part of the cellular structure of a soundproofing coating. The two structures 11 of FIG. 6 are identical to one another and the longitudinal portions depicted are likewise identical. Nevertheless, one of the two structures 11 has been reversed with respect to the other in the longitudinal direction (which is to say, turned through 180° about the vertical direction D3).

In general, two transversely adjacent structures 11 are mounted in a staggered configuration which means to say that each first cavity 6 of one structure 11 is adjacent, in the transverse direction D2, to two second cavities 8 of neighboring structures, and each second cavity 8 of one structure 11 is adjacent, in the transverse direction D2, to two first cavities 6 of neighboring structures.

Such a staggered configuration can be obtained by assembling alternately structures 11 that have been rotated through 180° with respect to their neighbors, or by assembling with every second structure 11 being longitudinally offset. The solution employing a longitudinal offset nevertheless exhibits the technical difficulty that the structures after assembly will have longitudinally offset ends, necessitating a particular processing of the longitudinal edges of the coating (cutting them off or filling this offset, etc.).

Figure 7:
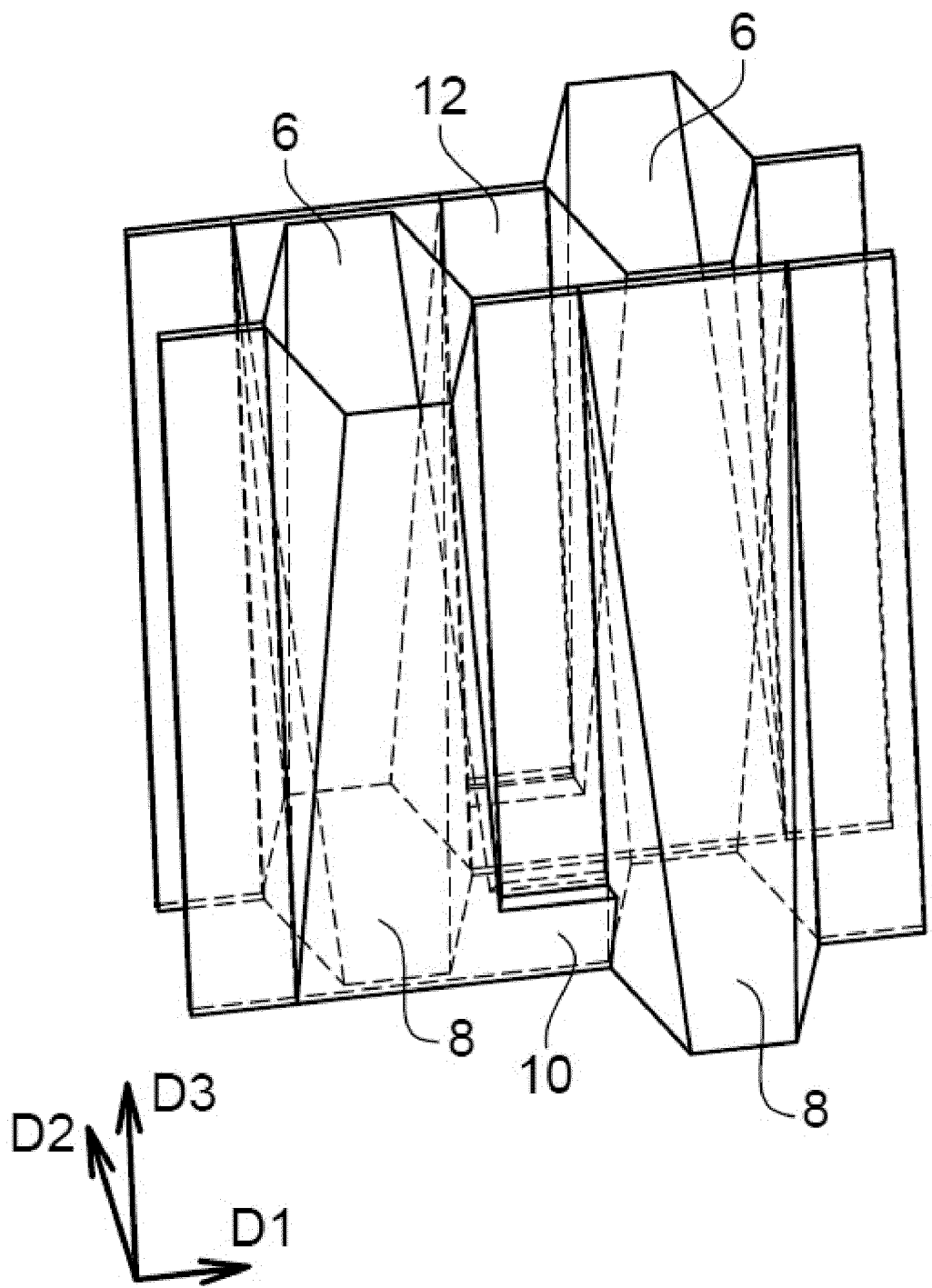
FIG. 7 depicts, in a three-dimensional schematic view, the structures of FIG. 6 after assembly, forming a portion of acoustic coating.

The result of transversely joining and assembling two structures 11 of FIG. 6 is depicted in FIG. 7.

Because of the respective restrictions in cross section of the first cavities 6 and the second cavities 8, the first cavities 6 and second cavities 8 nest in one another transversely, so that the walls bounding the first cavities and second cavities in the transverse direction D2 come into contact with one another.

It is notable that the joining of two structures 11 also forms intermediate cavities 12. The intermediate cavities 12 are in longitudinal gaps situated between the first cavities and the second cavities of two transversely adjacent structures 11. The intermediate cavities 12 have a substantially parallelogram-shaped cross section at the first face 1. The intermediate cavities 12 extend transversely between the walls 71, 72, 91, 92 of the first strips and second strips joined together to form the structures 11. The intermediate cavities 12 are closed at the second face 3 by the closure sheet installed at the second face 3 of the soundproofing coating.

The cross section of the intermediate cavities 12 changes through the thickness of the soundproofing coating (in the third direction D3) because this cross section is defined:
  near the first face 1 transversely by the walls 71, 72, 91, 92 of the first strips 4 and second strips 5 which are joined together and longitudinally by the walls of two first cavities 6 of adjacent structures 11,
  near the second face 3 transversely by the walls 71, 72, 91, 92 of the first strips 4 and second strips 5 that are joined together and longitudinally by the walls of two second cavities 8 of adjacent structures 11,
  and in the thickness of the coating, transversely by the walls 71, 72, 91, 92 of the first strips 4 and second strips 5 joined together and longitudinally in part by the walls of two first cavities 6 of adjacent structures 11 and in part by the walls of two second cavities 8 of adjacent structures 11.

Forming a cellular structure of a soundproofing coating by joining together structures with complementing geometries allowing them to nest together and form the desired cavities between them also avoids the need to join multiple walls in the cellular structure, thereby optimizing the mass of the coating.

Figure 8:
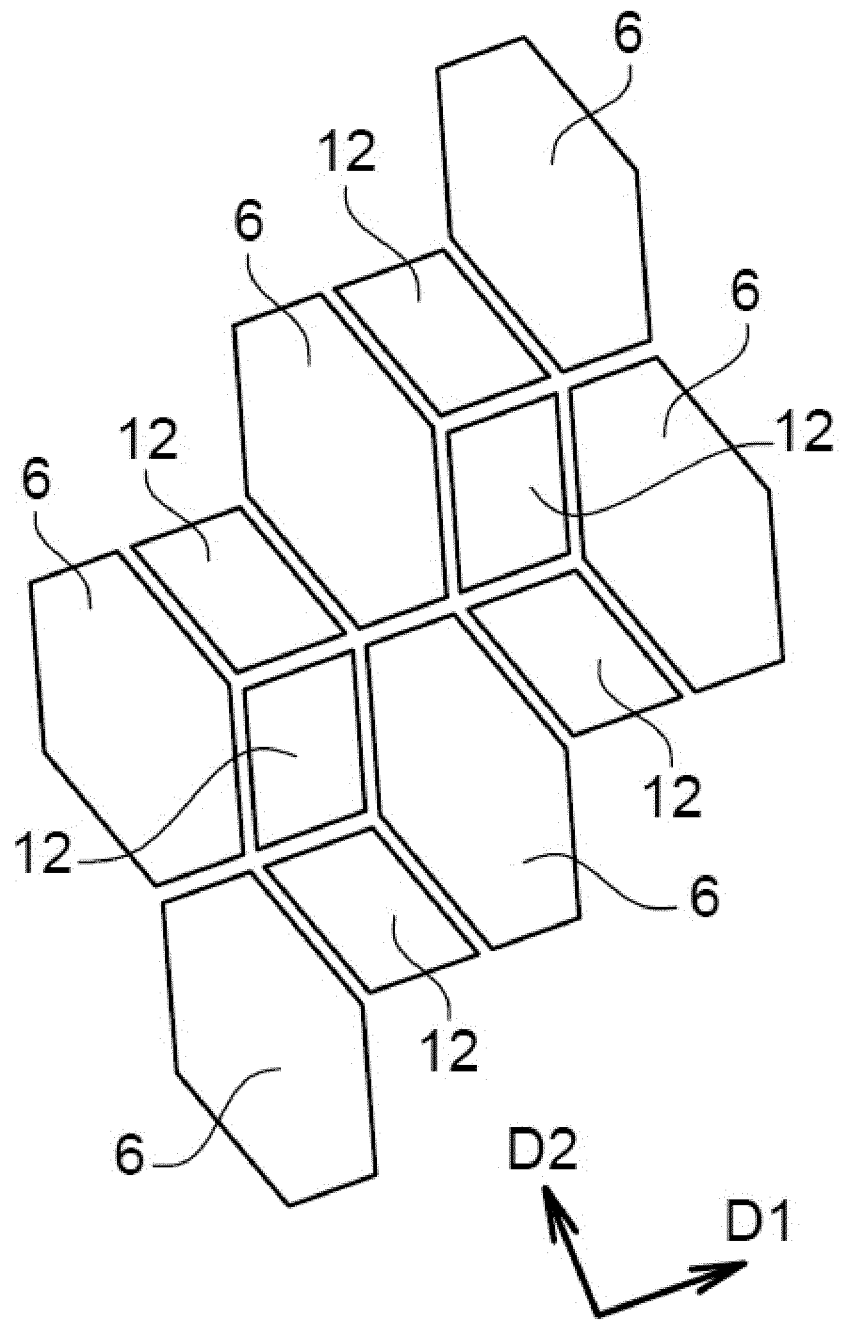
FIG. 8 depicts, in a schematic view, a first face of an acoustic coating according to one exemplary embodiment of the invention.

The distribution of the openings of the cavities in the exemplary embodiment depicted, at the first face 1, is depicted in FIG. 8. The first cavities 6 and the intermediate cavities 12 thus open onto the first face 1 in a uniform and perfectly nesting together way.

It is notable that, at the second face 3, in the absence of a closure sheet, a similar pattern would be seen, formed by the second cavities 8 of hexagonal opening and the intermediate cavities 12 the cross section of the openings of which is that of a parallelogram, at the second face 3.

The intermediate cavities 12 form resonators capable of handling acoustic frequency ranges that are different (theoretically higher) than those handled by the first cavities and second cavities forming the coupling of the Helmholtz and quarter-wave resonators.

Thus, the acoustic coating has a cellular structure offering three types and dimensions of cavity, able to handle a frequency range that is very broad in comparison with a coating having just one geometry of cells.

The cellular structure obtained by transversely joining structures 11, themselves obtained by transversely joining shaped strips 4, 5, is thus relatively simple to produce and to employ. It is also possible to apply a curvature, notably a transverse curvature, to this cellular structure. A soundproofing coating is obtained by adding a closure sheet, typically a solid sheet, to one of the surfaces of the cellular structure, thus forming a closed face, and applying a resistive sheet (for example a sheet of metal or of carbon provided with multiple perforations or a sheet comprising a metal mesh permeable to the acoustic waves) to the other face which thus remains open.

Figure 9:
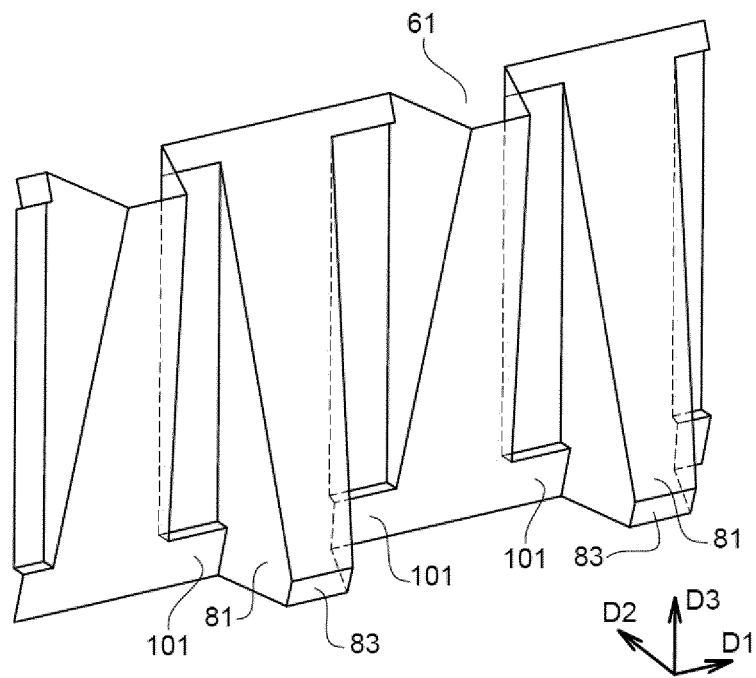
FIG. 9 depicts, in a three-dimensional schematic view, an element that makes up an acoustic coating according to one exemplary embodiment of the invention having optimized drainage.
Figure 10:
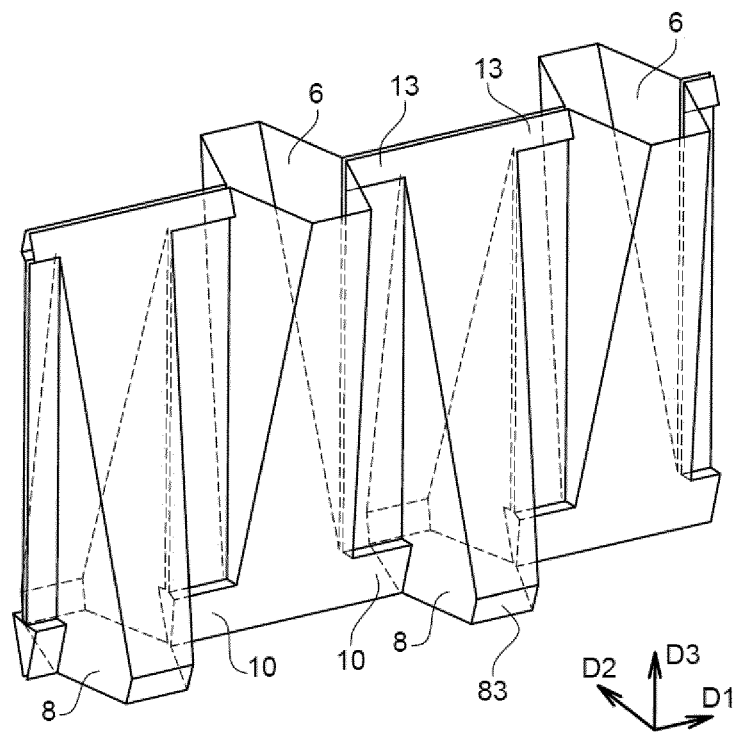
FIG. 10 depicts, in a three-dimensional schematic view, a structure that makes up an acoustic coating according to one exemplary embodiment of the invention with optimized drainage.
Figure 11:
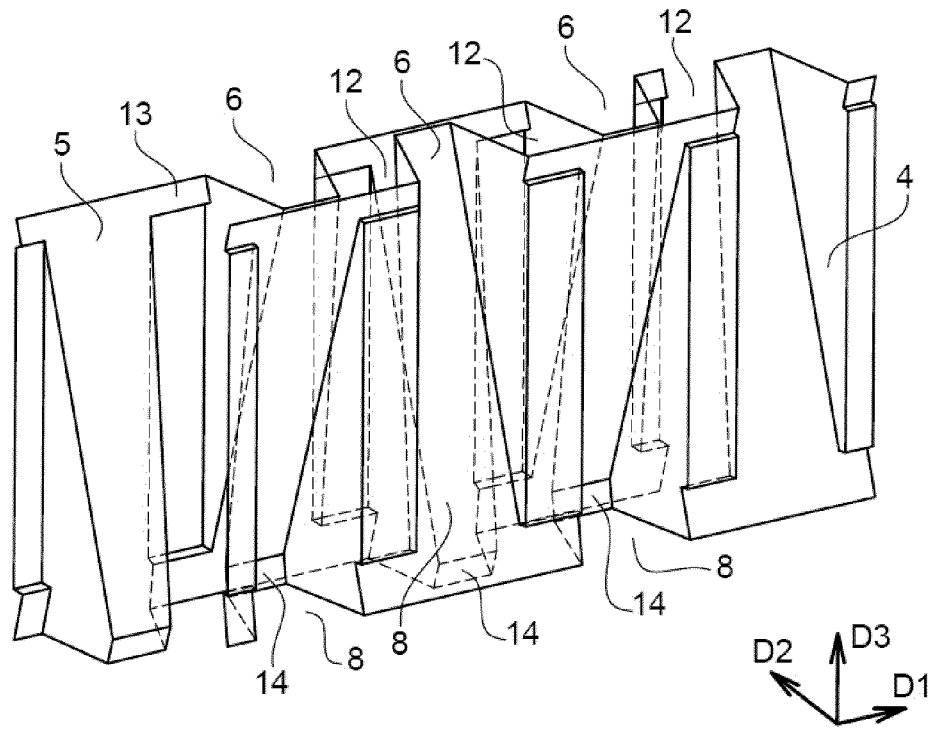
FIG. 11 depicts, in a three-dimensional schematic view, two assembled elements that make up an acoustic coating according to one exemplary embodiment of the invention with optimized drainage.

A final aspect of the invention is illustrated in FIGS. 9 to 11. In a soundproofing panel or coating it is important to provide means that allow it to drain, which is to say, that remove the water which may enter or may form by condensation in the cellular structure of the coating. Drainage consists in placing the cavities in communication with one another via small-sectioned passages that allow the water present in the structure to circulate under gravity until they reach one or more removal points.

FIG. 9 illustrates a second strip 5 provided with one example of drainage means applicable to the invention. FIG. 10 illustrates a structure 11 formed of the second strip 5 of FIG. 9 and of a symmetrical first strip 4 joined to it.

As far as the first cavities 6 and second cavity 8 are concerned, it is necessary to allow drainage at the second face 3, which is closed. To do that, in addition to the passage 10 formed between a first cavity 6 and a neighboring second cavity 8, a passage 10 that is analogous or of smaller cross section is formed (by a half-passage 101 formed in the second strip 5 and a half-passage formed accordingly in the first strip 4) leading toward the other neighboring second cavity 8. Thus, in a structure 11, water is able to flow along the entire length of the structure between the first and second cavities, at the second face 3, until it is removed from the coating, typically at a low point thereof.

So far as concerns the second cavities 8, which are likewise closed at the first face, ducts 13 analogous to the passages 10 but of smaller cross section are formed between each second cavity 8 and its neighboring first cavities 6, at the first face 1.

This allows communication between the second cavities 8 and the first cavities 6 of a structure 11 at the first face 1, and removal of water via the open face of the first cavities and, where applicable, via the resistive sheet of the first face 1, or by removal at a low point of the coating.

Insofar as concerns the intermediate cavities, which are closed at the second surface, these are placed in communication with one another by a drain 14 formed at the second face 3. To form the drain 14, a longitudinal notch 83 is formed by the wall transversely delimiting each second cavity 8.

FIG. 11 depicts the second panel 5 and the first panel 4 of two transversely adjacent structures 11. As illustrated in FIG. 11, at the time of assembly of two adjacent structures 11, there remains a space forming the drain 14 between the wall transversely delimiting the second cavity 8 and the wall of the corresponding first cavity 6 of the adjacent structure.

Figure 12:
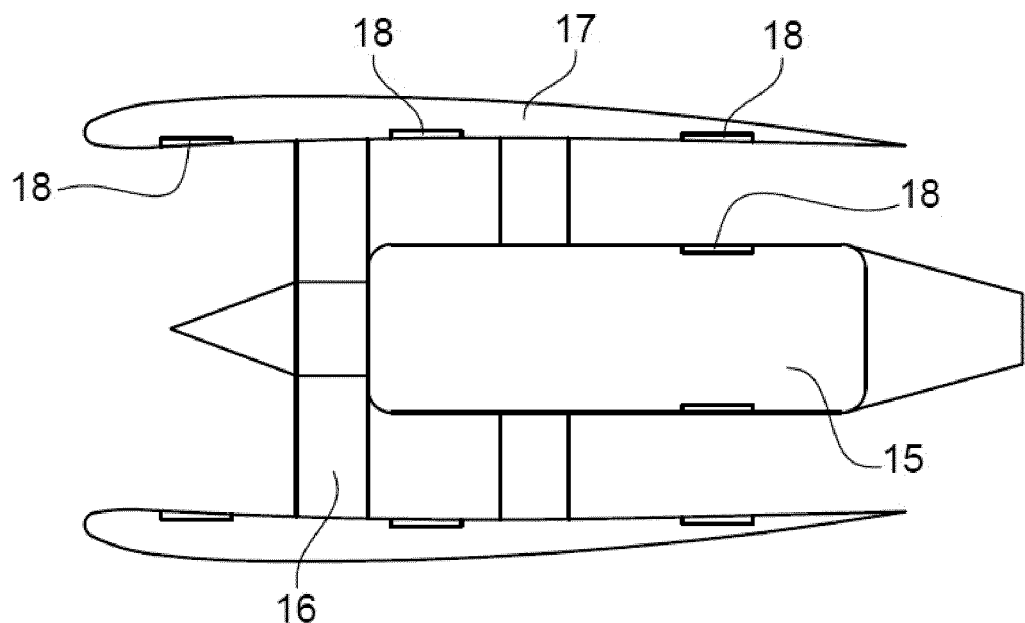
FIG. 12 schematically depicts a view in cross section of an aircraft propulsion unit of which the nacelle is equipped with a soundproofing coating.

The invention finds a preferred application in the formation of a soundproofing panel for an aircraft propulsion unit nacelle. An aircraft propulsion unit is schematically depicted in section in FIG. 12. It comprises an engine 15 comprising a turbomachine equipped with a fan 16, and which is installed in a nacelle 17. The coating 18 may be installed at various points that are particularly exposed to sound waves, in the nacelle and more generally in the propulsion unit. The soundproofing coating 18 according to one embodiment of the invention may be installed in such a way as to form, at least in part, the internal face of the anterior part of the nacelle of the aircraft propulsion unit. The coating 18 may be installed in a median zone of the internal face of the nacelle, behind the fan 16. The coating 18 may also be installed on an internal face of the rear part of the nacelle. The coating 18 may also be installed on a casing of the engine 15.

The invention thus developed offers an acoustic coating that is suitable for handling low frequencies compared with the coatings of the same thickness known in the state of the art. Furthermore, due to the presence of cavities of three sizes with different shapes, namely first and second cavities in communication with one another to form Helmholtz resonators to handle low frequencies and intermediate cavities for handling higher frequencies, the range of the frequencies handled by the coating is not only offset in comparison with a conventional acoustic panel, but also widened.

The formation of the coating, particularly of its cellular structure, using structures with complementing geometries avoids the need to join multiple walls together, thereby optimizing the mass of the coating. This coating can be obtained by conventional industrial forming processes. It is easy to implement. The drainage of the water present in the cellular structure can easily be organized therein. The invention is compatible with the formation of a curved soundproofing coating. The coating thus finds a preferred application in aircraft propulsion unit nacelles the surfaces of which exhibit one or two radii of curvature.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A soundproofing coating comprising a cellular structure formed in a thickness of the coating between an open first face, permeable to acoustic waves, and a closed second face formed by a closure sheet,
   wherein the cellular structure is made up by joining, in a transverse direction, several structures, each of said structures being formed by joining, in the transverse direction, a first longitudinal strip of a first geometry with a second longitudinal strip of a second geometry,
   the first strip and the second strip forming a structure being configured so that each structure exhibits successively and repeating in a longitudinal direction:
      a first cavity extending between the first face and the second face and open at the first face and of which the cross section narrows progressively between the first face and the second face until said first cavity becomes closed by connection of the first strip and the second strip,
      a first joining of two walls belonging respectively to the first strip and to the second strip in contact with one another over part of the thickness of the coating so that a passage is created between the first cavity and a second cavity,
         said second cavity, which has a cross section that increases progressively between the first face, at which said second cavity is closed by connection of the first strip and the second strip, and the second face and which is closed at the second face of the coating by the closure sheet, and
      a second joining of two walls belonging respectively to the first strip and to the second strip in contact with one another over all or part of the thickness of the coating.

2. The soundproofing coating as claimed in claim 1 wherein, in each structure, the first strip and the second strip are symmetrical along a longitudinal plane.

3. The soundproofing coating as claimed in claim 1, wherein the passage between the first cavity and the second cavity is formed near the second face of the coating.

4. The soundproofing coating as claimed in claim 1, wherein the joining of the structures is performed in a staggered configuration, each first cavity of one structure being adjacent, in the transverse direction, to two second cavities of neighboring structures, and each second cavity of one structure being adjacent, in the transverse direction, to two first cavities of neighboring structures.

5. The soundproofing coating as claimed in claim 4, wherein an intermediate cavity, open at the first face, is formed longitudinally between each first cavity of two transversely adjacent structures.

6. The soundproofing coating as claimed in claim 5, wherein each first cavity has a hexagonal open cross section at the first face, and each intermediate cavity has a parallelogram-shaped cross section at the first face.

7. The soundproofing coating as claimed in claim 5, wherein a drain is formed, near the second face, between two longitudinally successive intermediate cavities.

8. The soundproofing coating as claimed in claim 1, wherein there are formed:
   for each first cavity, the passage between the second cavity and each of the first cavities longitudinally closest to said second cavity, thus placing said first cavities in communication via said second cavity, near the second face of the coating; and for each second cavity, a duct of cross section equal to or smaller than that of the passage connecting said second cavity to at least one neighboring first cavity, near the first face of the coating.

9. An aircraft propulsion unit comprising a nacelle and an engine, wherein at least one of an internal surface of the nacelle or an external surface of a casing of the engine has a soundproofing coating as claimed in claim 1.

10. A method for manufacturing a soundproofing coating as claimed in claim 1, comprising the steps of:

shaping the first strips each comprising, in a longitudinal direction, repeats of a pattern formed of a half first cavity, a first wall in a first plane, a half second cavity, a second wall in the first plane, and a half passage, between the half first cavity and the half second cavity at the first wall, shaping the second strips each comprising, in the longitudinal direction, repeats of a pattern formed of a half first cavity, a first wall in a second plane, a half second cavity, a second wall in the second plane, and a half passage is formed between the half first cavity and the half second cavity, at the first wall;

forming structures by joining, in a transverse direction, one of the first strips with one of the second strips;

joining several structures in the transverse direction.

11. A soundproofing coating comprising a cellular structure formed in a thickness of the coating between an open first face, permeable to acoustic waves, and a closed second face formed by a closure sheet, wherein the cellular structure is made up by joining, in a transverse direction, several structures, each of said structures being formed by joining, in the transverse direction, a first longitudinal strip of a first geometry with a second longitudinal strip of a second geometry, the first strip and the second strip forming a structure being configured so that each structure exhibits successively and repeating in a longitudinal direction:

a first cavity extending between the first face and the second face and open at the first face and of which the cross section narrows progressively between the first face and the second face until said first cavity becomes closed, a first joining of two walls belonging respectively to the first strip and to the second strip in contact with one another over part of the thickness of the coating so that a passage is created between the first cavity and a second cavity, said second cavity, which has a cross section that increases progressively between the first face and the second face and which is closed at the first face and at the second face of the coating by the closure sheet, and a second joining of two walls belonging respectively to the first strip and to the second strip in contact with one another over all or part of the thickness of the coating, and wherein there are formed:

for each first cavity, the passage between the second cavity and each of the first cavities longitudinally closest to said second cavity, thus placing said first cavities in communication via said second cavity, near the second face of the coating; and for each second cavity, a duct of cross section equal to or smaller than that of the passage connecting said second cavity to at least one neighboring first cavity, near the first face of the coating.

\* \* \* \* \*